(12) United States Patent
Nakano

(10) Patent No.: US 12,069,218 B2
(45) Date of Patent: Aug. 20, 2024

(54) INFORMATION PROCESSING DEVICE, SCAN DATA PROCESSING METHOD, AND SCAN DATA PROCESSING PROGRAM

(71) Applicant: SEIKO EPSON CORPORATION, Tokyo (JP)

(72) Inventor: Yusuke Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/054,731

(22) Filed: Nov. 11, 2022

(65) Prior Publication Data
US 2023/0156136 A1 May 18, 2023

(30) Foreign Application Priority Data
Nov. 12, 2021 (JP) .................. 2021-184957

(51) Int. Cl.
*H04N 1/21* (2006.01)
*H04N 1/00* (2006.01)
*H04N 1/32* (2006.01)

(52) U.S. Cl.
CPC ..... *H04N 1/32133* (2013.01); *H04N 1/00039* (2013.01); *H04N 1/00074* (2013.01); *H04N 1/21* (2013.01)

(58) Field of Classification Search
CPC ............ H04N 1/0036; H04N 1/00363; H04N 1/00374; H04N 1/2166; H04N 1/32133; H04N 2201/3287

USPC ........................................................ 358/403
See application file for complete search history.

(56) References Cited

U.S. PATENT DOCUMENTS

| | | | | |
|---|---|---|---|---|
| 2004/0207871 A1* | 10/2004 | Ando | ................. | H04N 1/00572 358/1.6 |
| 2009/0161149 A1* | 6/2009 | Noguchi | .............. | H04N 1/4413 358/1.14 |
| 2009/0244583 A1* | 10/2009 | Ogasawara | ........ | G03G 15/5025 358/1.13 |
| 2016/0042229 A1* | 2/2016 | Liao | ..................... | H04N 1/2166 358/403 |
| 2016/0321018 A1* | 11/2016 | Okabe | ..................... | H04N 1/10 |

FOREIGN PATENT DOCUMENTS

JP 2007-102545 A 4/2007

* cited by examiner

*Primary Examiner* — Kent Yip
(74) *Attorney, Agent, or Firm* — WORKMAN NYDEGGER

(57) ABSTRACT

An information processing device includes: a storage unit configured to store scan data read from a plurality of documents; and a processing unit configured to acquire, based on the scan data, identification information corresponding to an identification code present in the document, and generate, based on the scan data, extraction data obtained by collecting electronic data of the documents associated with the identification information among the plurality of documents. The processing unit analyzes the extraction data and performs processing corresponding to an analysis result.

15 Claims, 11 Drawing Sheets

FIG. 3

| IDENTIFICATION CODE C0 | INFORMATION IN0 INCLUDED IN IDENTIFICATION CODE |
|---|---|
| COLLECTION PACKAGING COMMODITY CODE | INDICATOR: 1 DIGIT<br>CHECK DIGIT: 1 DIGIT<br>SINGLE ITEM IDENTIFICATION INFORMATION: 12 DIGITS<br>IN1 |
| LOGISTICS COMMODITY CODE | LOGISTICS IDENTIFICATION CODE: 1 DIGIT<br>COUNTRY CODE: 2 DIGITS<br>CHECK DIGIT: 1 DIGIT<br>MANUFACTURER IDENTIFICATION INFORMATION: 5 DIGITS<br>COMMODITY ITEM IDENTIFICATION INFORMATION: 5 DIGITS<br>IN1 |
| PERIODIC PUBLICATION CODE | FLAG: 3 DIGITS<br>PRELIMINARY CODE: 1 DIGIT<br>CHECK DIGIT: 1 DIGIT<br>YEAR NUMBER: 1 DIGIT<br>ISSUE NUMBER: 2 DIGITS<br>PERIODIC PUBLICATION IDENTIFICATION INFORMATION: 5 DIGITS<br>ADD-ON CODE: 5 DIGITS<br>IN1 |

FIG. 4

| IDENTIFICATION CODE C0 | INFORMATION IN0 INCLUDED IN IDENTIFICATION CODE |
|---|---|
| COLLECTION PACKAGING COMMODITY CODE | INDICATOR: 1 DIGIT<br>CHECK DIGIT: 1 DIGIT<br>SINGLE ITEM IDENTIFICATION INFORMATION: 12 DIGITS<br>IN2, IN3 — IN1 — IN2 |
| LOGISTICS COMMODITY CODE | LOGISTICS IDENTIFICATION CODE: 1 DIGIT<br>COUNTRY CODE: 2 DIGITS<br>CHECK DIGIT: 1 DIGIT<br>MANUFACTURER IDENTIFICATION INFORMATION: 5 DIGITS<br>COMMODITY ITEM IDENTIFICATION INFORMATION: 5 DIGITS<br>IN2 — IN1 — IN2, IN3 — IN2 |
| PERIODIC PUBLICATION CODE | FLAG: 3 DIGITS<br>PRELIMINARY CODE: 1 DIGIT<br>CHECK DIGIT: 1 DIGIT<br>YEAR NUMBER: 1 DIGIT<br>ISSUE NUMBER: 2 DIGITS<br>PERIODIC PUBLICATION IDENTIFICATION INFORMATION: 5 DIGITS<br>ADD-ON CODE: 5 DIGITS<br>IN2 — IN1 — IN2, IN3 — IN2 |

FIG. 7

PROCESSING WHEN VIOLATING CONSTRAINT CONDITION:

| DIVIDE FILE ▽ | ← 507 |
| --- | --- |
| DIVIDE FILE | — 531 |
| DISPLAY ERROR | — 532 |
| SUSPEND JOB | — 533 |

FIG. 8

RESULT CLASSIFICATION METHOD:

| COMPLETE MATCH ▽ | ← 508 |
| --- | --- |
| COMPLETE MATCH | — 541 |
| COLLECTION PACKAGING COMMODITY CODE | — 542 |
| MANUFACTURER CODE | — 543 |
| COMMODITY ITEM CODE | — 544 |
| PERIODIC PUBLICATION CODE | — 545 |
| USER DEFINITION (1ST TO 7TH DIGIT) | — 546 |
| SETTING | — 547 |

INFORMATION PROCESSING DEVICE, SCAN DATA PROCESSING METHOD, AND SCAN DATA PROCESSING PROGRAM

The present application is based on, and claims priority from JP Application Serial Number 2021-184957, filed Nov. 12, 2021, the disclosure of which is hereby incorporated by reference herein in its entirety.

BACKGROUND

1. Technical Field

The present disclosure relates to a technique for collecting electronic data of documents associated with common identification information.

2. Related Art

A document bundle including documents in which an identification code such as a barcode or a two-dimensional code is present is read, and electronic data of the documents associated with identification information obtained from the identification code are collected into one file.

An electronic document creation device disclosed in JP-A-2007-102545 reads a two-dimensional code included in a paper document, and collects electronic documents associated with the same two-dimensional code as the read two-dimensional code to create one new electronic document.

A user may fail to perform a reading operation such as mix-up of a document bundle or scanning a scanned document. In this case, in order to find the failure in the reading operation, the user needs to open the file and visually confirm a content.

SUMMARY

An information processing device according to an aspect of the present disclosure includes: a storage unit configured to store scan data read from a plurality of documents; and a processing unit configured to acquire, based on the scan data, identification information included in an identification code present in the plurality of documents, and generate, based on the scan data, extraction data obtained by collecting electronic data of the documents associated with the identification information among the plurality of documents, in which the processing unit performs different processing depending on whether a generation result of the extraction data is against a set constraint condition.

A scan data processing method according to an aspect of the present disclosure is a scan data processing method of processing scan data read from a plurality of documents, the method includes: an acquisition step of acquiring, based on the scan data, identification information included in an identification code present in the plurality of documents; and a generation step of generating, based on the scan data, extraction data obtained by collecting electronic data of the documents associated with the identification information among the plurality of documents, in which the generation step performs different processing depending on whether a generation result of the extraction data is against a set constraint condition.

Further, a non-transitory computer-readable storage medium according to an aspect of the present disclosure is a non-transitory computer-readable storage medium storing a scan data processing program configured to process scan data read from a plurality of documents, the program causing a computer to implement: an acquisition function of acquiring, based on the scan data, identification information included in an identification code present in the plurality of documents; and a generation function of generating, based on the scan data, extraction data obtained by collecting electronic data of the documents associated with the identification information among the plurality of documents, in which the generation function performs different processing depending on whether a generation result of the extraction data is against a set constraint condition.

BRIEF DESCRIPTION OF THE DRAWINGS

FIG. 3 is a diagram schematically showing an example of information included in an identification code.

FIG. 4 is a diagram schematically showing an example in which a part of the information included in the identification code is used as the identification information.

FIG. 7 is a diagram schematically showing an example of items in a violation processing selection field.

FIG. 8 is a diagram schematically showing an example of items in a classification method selection field.

DESCRIPTION OF EXEMPLARY EMBODIMENTS

Figure 1:
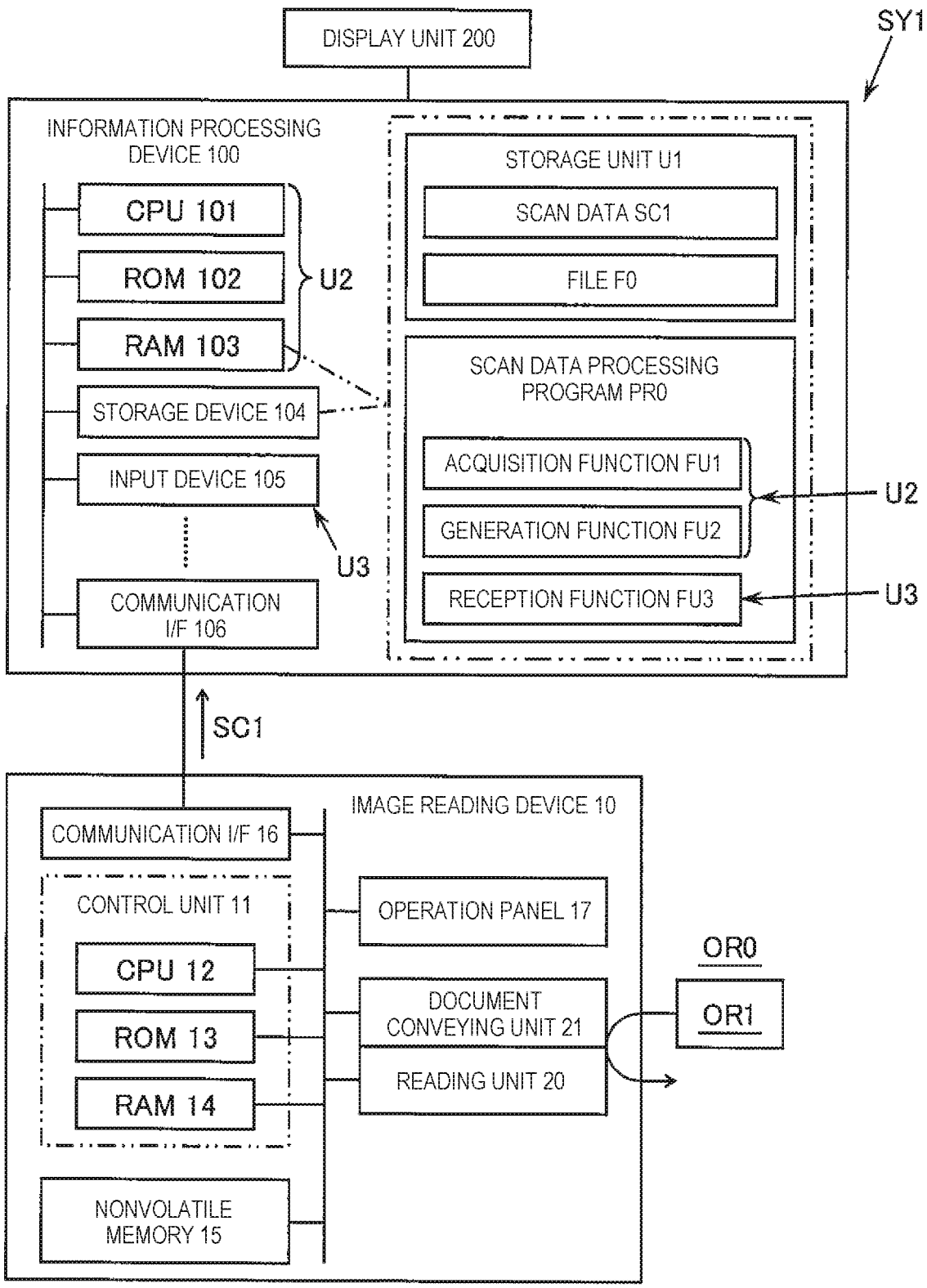
FIG. 1 is a block diagram schematically showing a configuration example of an image reading system.

Hereinafter, embodiments of the present disclosure will be described. Of course, the following embodiments are merely examples of the present disclosure, and all of features shown in the embodiments are not necessarily essential to the solution of the present disclosure.

(1) Outline of Technique Included in Present Disclosure:

First, an outline of a technique included in the present disclosure will be described with reference to examples shown in FIGS. 1 to 12. Drawings of the present application are diagrams schematically showing examples, and enlargement ratios in respective directions shown in these drawings may be different from one another, and the drawings may not be consistent with one another. Of course, each element of the present technique is not limited to the specific examples indicated by reference numerals. In the "Outline of Technique Included in Present Disclosure", the parenthesis means a supplementary explanation of an immediately preceding word.

Aspect 1

Figure 2:
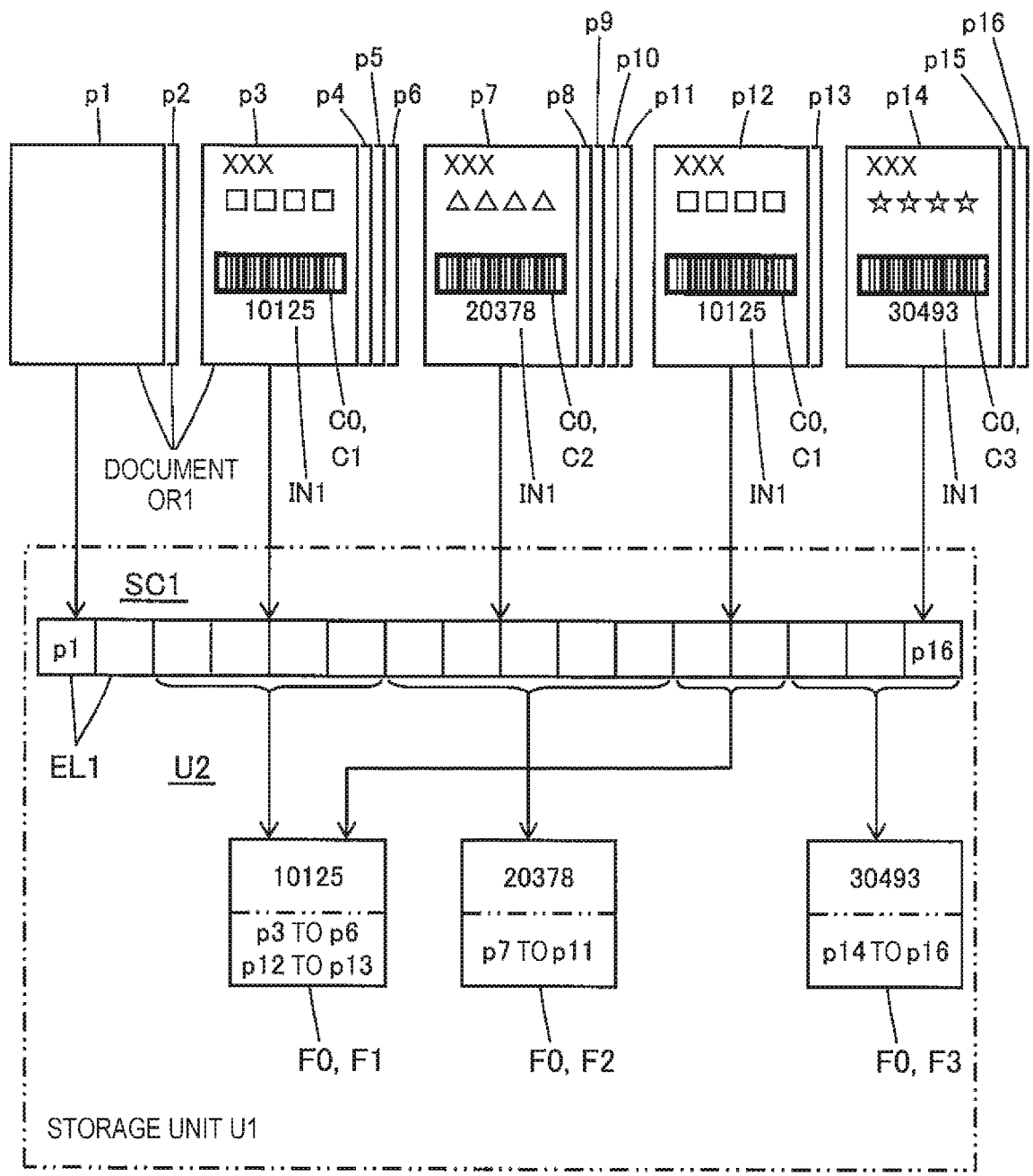
FIG. 2 is a diagram schematically showing an example of combined sorting that collects electronic data of documents associated with common identification information.
Figure 10:
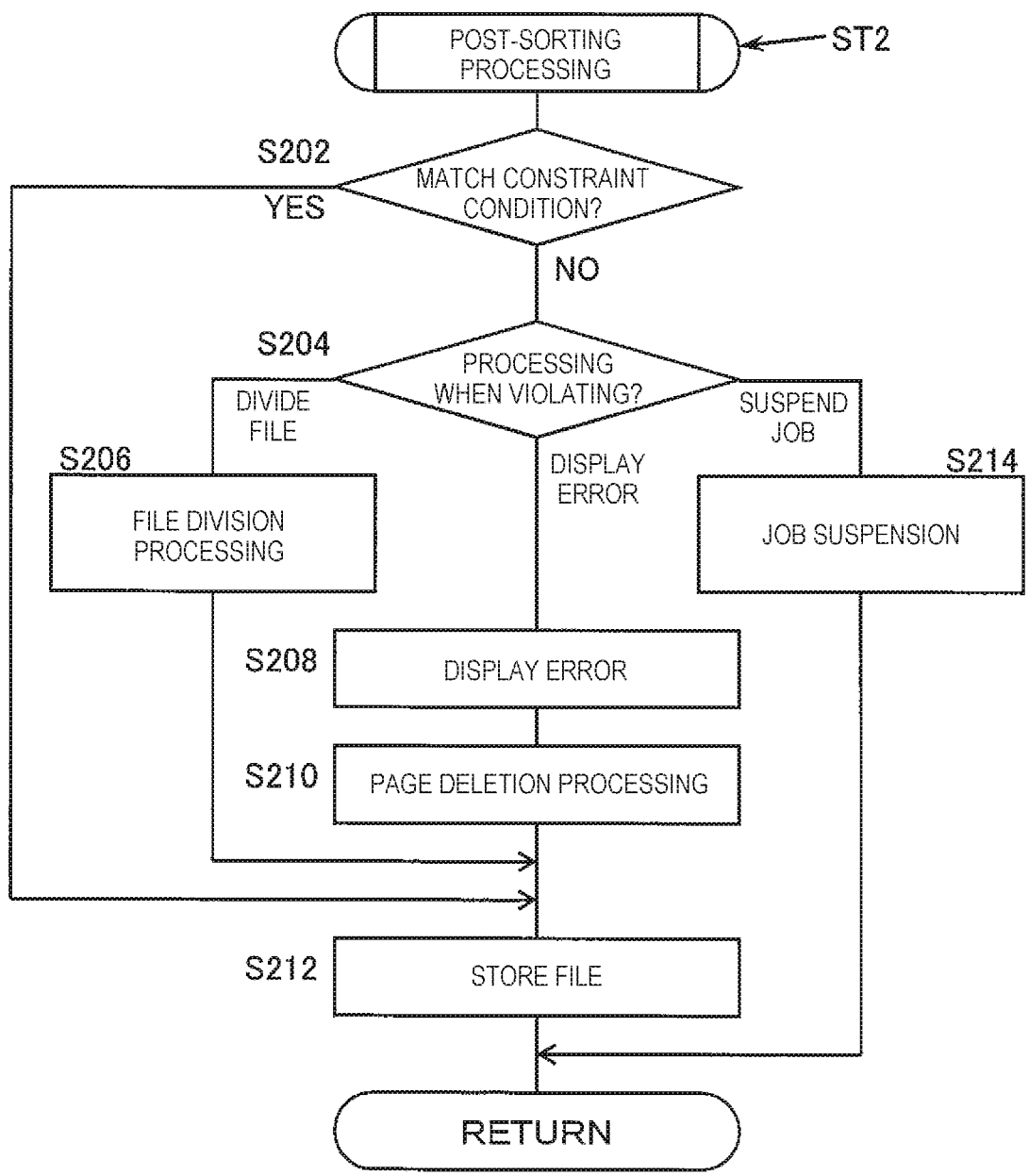
FIG. 10 is a flowchart showing an example of post-sorting processing.

As shown in FIG. 1, an information processing device 100 according to an aspect of the present technique includes a storage unit U1 and a processing unit U2. The storage unit U1 stores scan data SC1 read from a plurality of documents OR1. As shown in FIG. 2 and the like, the processing unit U2 acquires, based on the scan data SC1, the identification information IN1 included in an identification code C0 present in the plurality of documents OR1, and generates, based on the scan data SC1, extraction data (for example, a file F0) obtained by collecting the electronic data EL1 of the documents associated with the identification information IN1 among the plurality of documents OR1. As shown in FIG. 10, the processing unit U2 performs different processing depending on whether a generation result of the extraction data (F0) is against a set constraint condition.

In the Aspect 1 described above, different processing is performed depending on whether an error occurs in the combined sorting that collects the electronic data EL1 of the documents OR1 associated with the common identification information IN1. Therefore, the Aspect 1 can improve usability at the time of the combined sorting.

Here, the identification code includes a bar code, a two-dimensional code, a string of characters, and the like.

The identification information may be information itself included in the identification code, or may be information obtained by removing attached information such as a package form or an issue period (including an issue year and an issue month) from the information included in the identification code. The identification information may correspond to the identification code.

The above described additional statements are also applied to the following aspects.

Aspect 2

Figure 5:
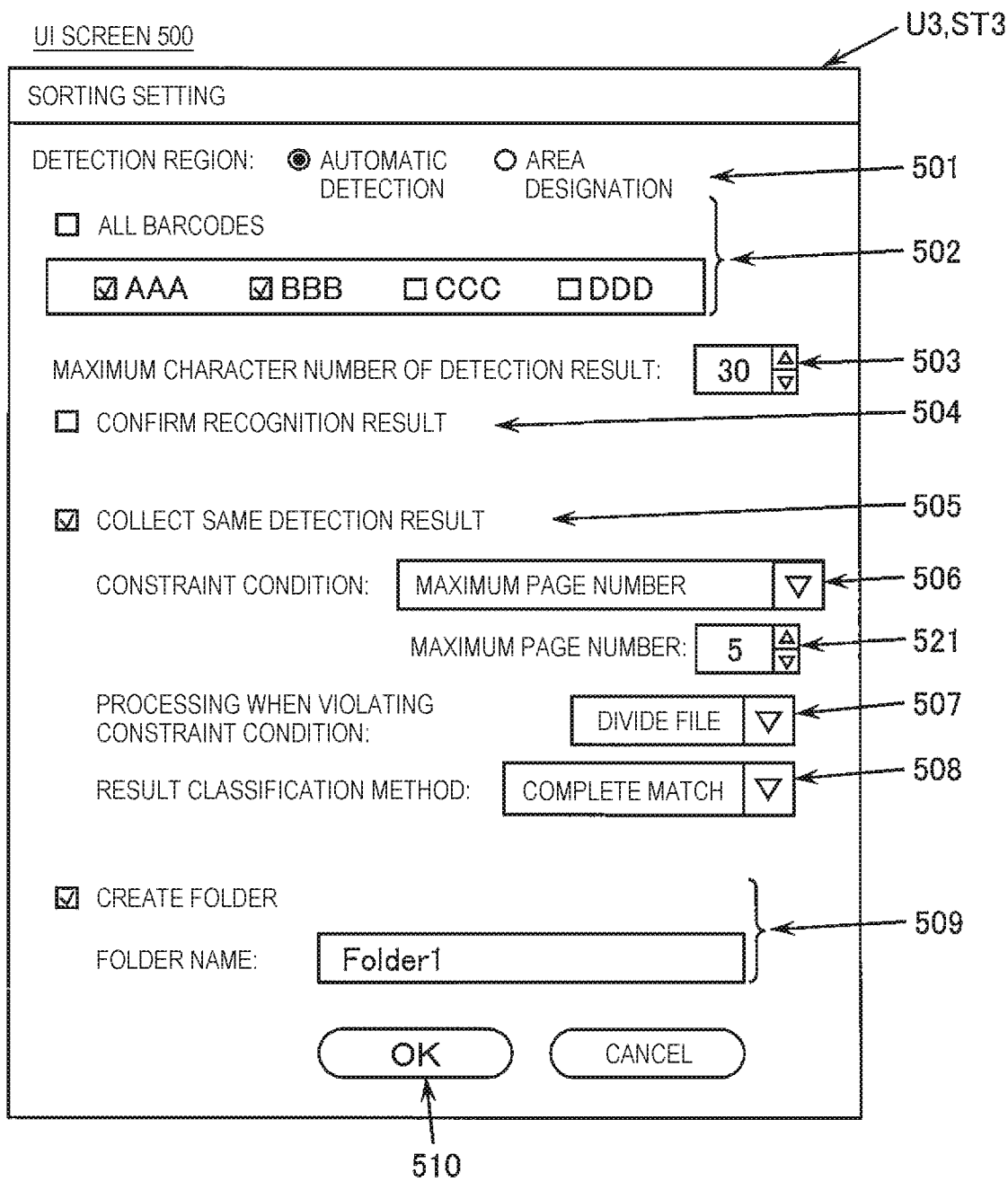
FIG. 5 is a diagram schematically showing a display example of a UI screen.

As shown in FIG. 5 and the like, the information processing device 100 may further include a reception unit U3 that receives a setting of the constraint condition. In the present aspect, since the constraint condition can be set, it is possible to improve the workability at the time of the combined sorting.

Aspect 3

Figure 6:
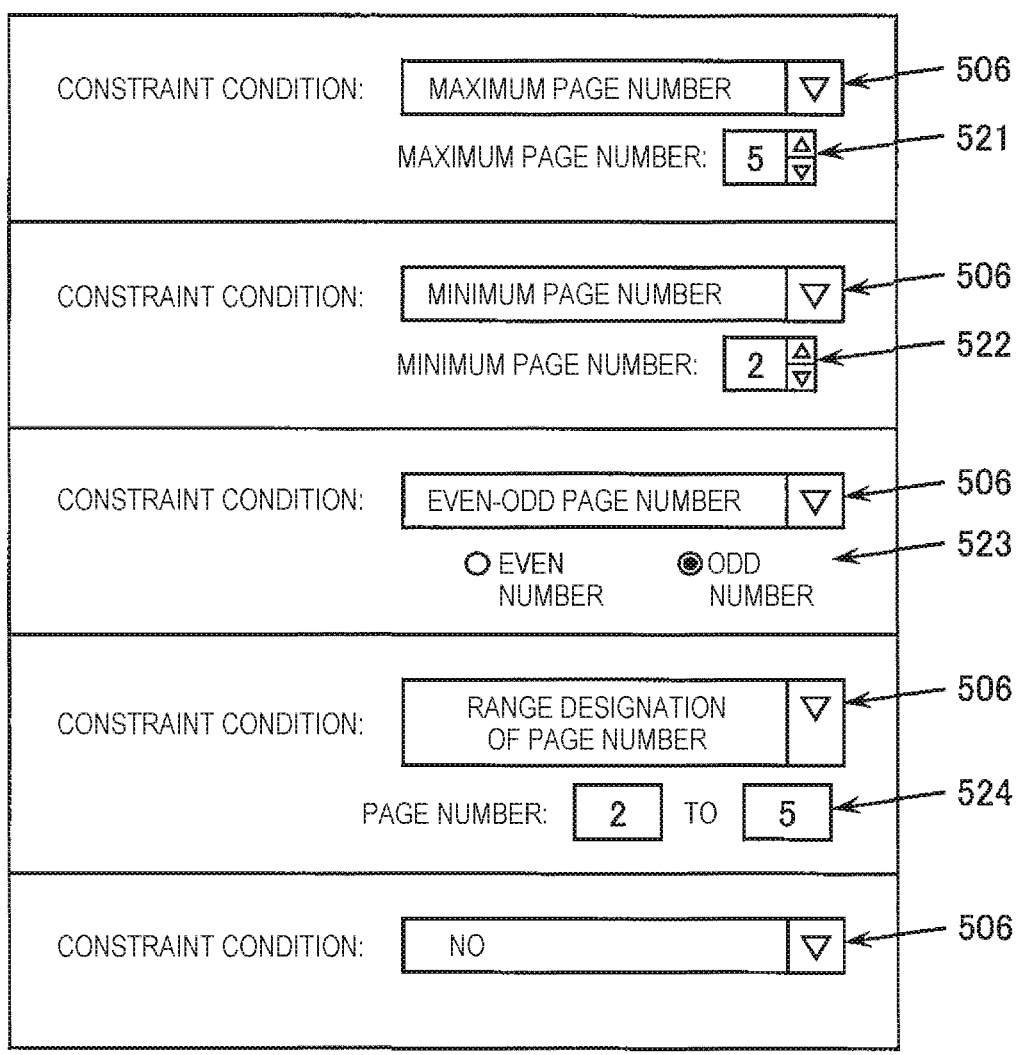
FIG. 6 is a diagram schematically showing an example of a display that changes according to items in a constraint condition selection field.

As shown in FIGS. 5 and 6, the reception unit U3 may be capable of receiving, as the constraint condition, a setting of a maximum page number of the extraction data (F0). When the setting of the maximum page number is received, the processing unit U2 may perform the different processing depending on whether a page number of the extraction data (F0) is larger than the maximum page number. When the page number of the extraction data (F0) is larger than the maximum page number, there is a high possibility that an error occurs in the combined sorting. Therefore, the present aspect can further improve the workability at the time of the combined sorting.

Aspect 4

As shown in FIG. 6, the reception unit U3 may be capable of receiving, as the constraint condition, a setting of a minimum page number of the extraction data (F0). When the setting of the minimum page number is received, the processing unit U2 may perform the different processing depending on whether a page number of the extraction data (F0) is smaller than the minimum page number. When the page number of the extraction data (F0) is smaller than the set minimum page number, there is a high possibility that an error such as a loss of page occurs in the combined sorting. Therefore, the present aspect can further improve the workability at the time of the combined sorting.

Aspect 5

As shown in FIG. 6, the reception unit U3 may be capable of receiving, as the constraint condition, a setting for selecting whether the page number of the extraction data (F0) is an even number or an odd number. When the setting of the selection is received, the processing unit U2 may perform the different processing depending on whether the page number of the extraction data (F0) is an odd number or an even number. When the even number or the odd number of the page number of the extraction data (F0) does not match with the even number or the odd number in the setting, there is a high possibility that an error such as mixing of an erroneous page or the loss of page occurs in the combined sorting. Therefore, the present aspect can further improve the workability at the time of the combined sorting.

Aspect 6

As shown in FIGS. 5 and 7, the reception unit U3 may further receive a setting of specific processing to be performed when the generation result is against the constraint condition. The processing unit U2 may perform the specific processing when the generation result is against the constraint condition, or may store the extraction data (F0) without performing the specific processing when the generation result is not against the constraint condition. In the present aspect, since the specific processing is performed when an error occurs in the combined sorting, it is possible to further improve the workability at the time of the combined sorting.

Aspect 7

Figure 11:
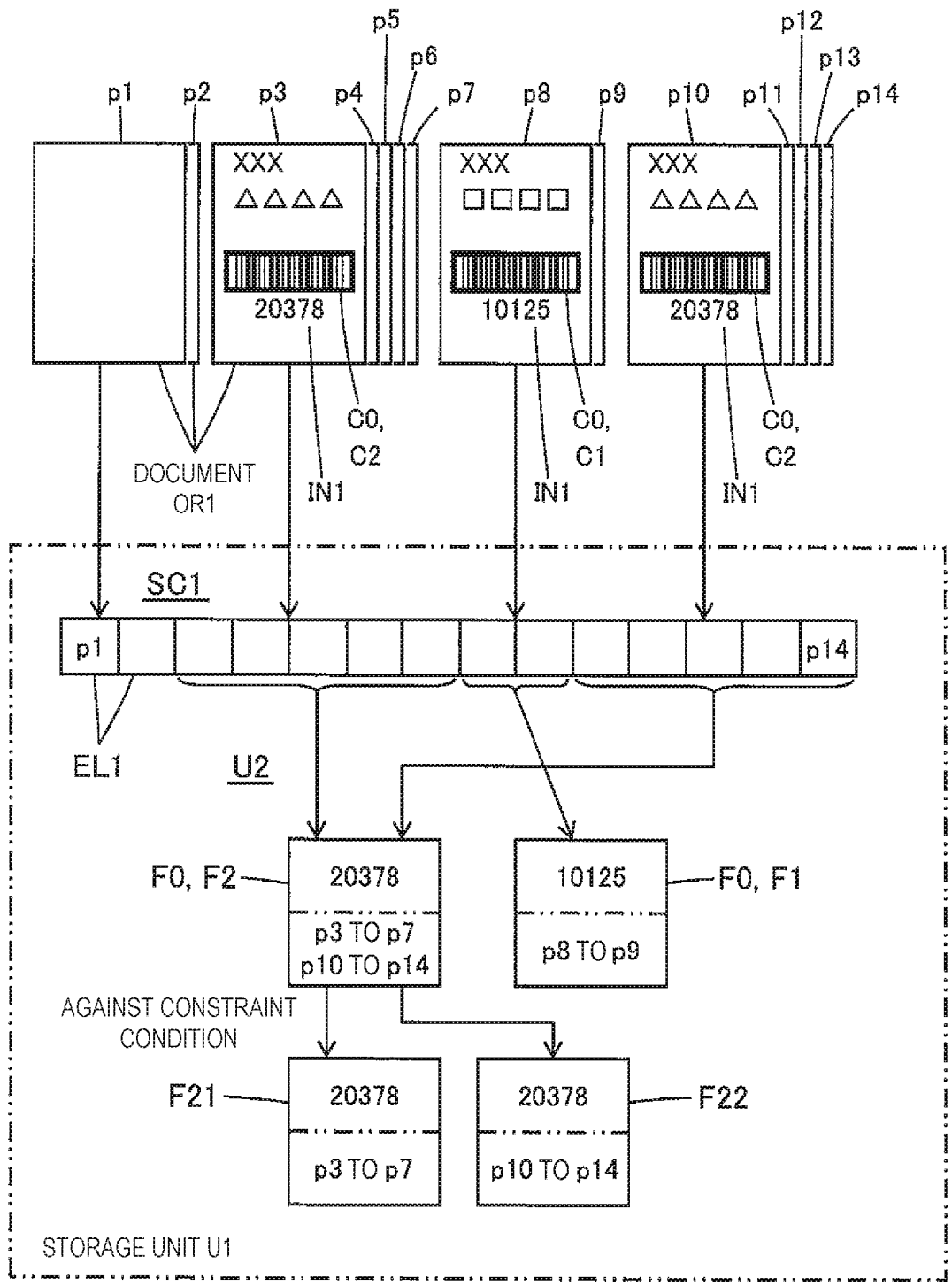
FIG. 11 is a diagram schematically showing an example of dividing a file when a constraint condition is violated.

As shown in FIG. 7, the reception unit U3 may be capable of receiving, as the specific processing, a setting of division processing of dividing the extraction data (F0). When the setting of the division processing is received, the processing unit U2 may divide the extraction data (F0) based on the constraint condition and store the extraction data (for example, files F21 and F22) after the division, as shown in FIGS. 10 and 11. In the present aspect, since the extraction data (F0) is divided when an error occurs in the combined sorting, it is possible to further improve the workability at the time of the combined sorting.

Aspect 8

Figure 12:
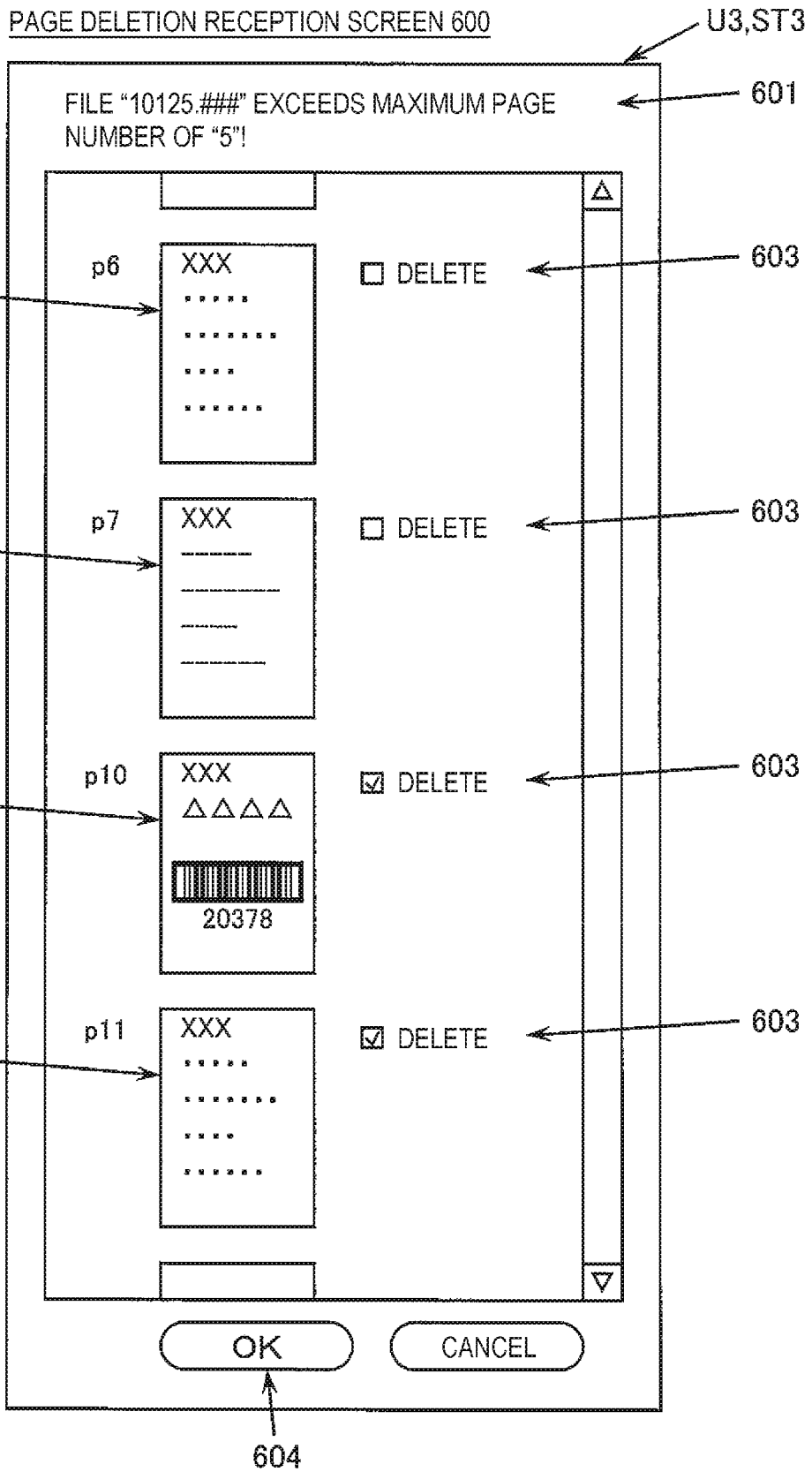
FIG. 12 is a diagram schematically showing a display example of a page deletion reception screen.

As shown in FIG. 7, the reception unit U3 may be capable of receiving, as the specific processing, a setting of error display processing for displaying an error 601. When the setting of the error display processing is received, the processing unit U2 may display the error 601 on a display unit 200 as shown in FIGS. 10 and 12. In the present aspect, since the error 601 is displayed when an error occurs in the combined sorting, it is possible to further improve the workability at the time of the combined sorting.

Aspect 9

As shown in FIGS. 10 and 12, the reception unit U3 may receive a designation of a page from which the electronic data EL1 is to be deleted from the extraction data (F0). The processing unit U2 may delete the electronic data EL1 corresponding to the page from the extraction data (F0), or may store the extraction data (F0) after the deletion. In the present aspect, since correct extraction data (F0) can be obtained by page deletion, it is possible to further improve the workability at the time of the combined sorting.

Aspect 10

As shown in FIG. 7, the reception unit U3 may be capable of receiving, as the specific processing, a setting of suspension processing in which the extraction data (F0) is not stored. When the setting of the suspension processing is received, the processing unit U2 may not store the extraction data (F0) as shown in FIG. 10. In the present aspect, since the processing is suspended when an error occurs in the combined sorting, it is possible to further improve the usability at the time of the combined sorting.

Aspect 11

As shown in FIG. 1, the information processing device 100 may further include a communication unit (for example, a communication interface 106) that receives the scan data SC1 from the image reading device 10. The storage unit U1 may store the received scan data SC1. In the present aspect, since the extraction data (F0) can be generated from the scan data SC1 received from the image reading device 10, it is possible to improve the workability of the combined sorting.

Here, the image reading device includes a scanner, a facsimile, a multifunction device having a function of reading a document and a function of outputting image data, and the like. The additional statements are also applied to the following aspects.

Aspect 12

A scan data processing method according to an aspect of the present technique is a scan data processing method of processing the scan data SC1 read from the plurality of documents OR1, and includes the following steps (A1) and (A2).

(A1) An acquisition step ST1 (for example, steps S102 to S106 shown in FIG. 9) of acquiring, based on the scan data SC1, the identification information IN1 included in the identification code C0 present in the plurality of documents OR1.

(A2) A generation step ST2 (for example, steps S108 to S124 shown in FIG. 9) of generating, based on the scan data SC1, the extraction data (F0) obtained by collecting the electronic data EL1 of the documents associated with the identification information IN1 among the plurality of documents OR1.

In the present scan data processing method, in the generation step ST2, different processing is performed depending on whether the generation result of the extraction data (F0) is against the set constraint condition (for example, steps S202 to S214 shown in FIG. 10).

In the Aspect 12 described above, different processing is performed depending on whether an error occurs in the combined sorting that collects the electronic data EL1 of the documents OR1 associated with the common identification information IN1. Therefore, the Aspect 12 can provide a scan data processing method that improves usability at the time of the combined sorting.

The scan data processing method may include a reception step ST3 corresponding to the reception unit U3.

Aspect 13

As shown in FIG. 1, a scan data processing program PR0 according to an aspect of the present technique causes a computer (for example, the information processing device 100) to implement an acquisition function FU1 corresponding to the acquisition step ST1 and a generation function FU2 corresponding to the generation step ST2. The present aspect can provide a scan data processing program for improving the usability at the time of the combined sorting.

The scan data processing program PR0 may cause a computer to implement a reception function FU3 corresponding to the reception step ST3.

Further, the present technique is applicable to an image reading system including an information processing device and an image reading device, a control method of the image reading system, a control program of the image reading system, a computer-readable medium in which any one of the above described programs is recorded, and the like. The information processing device may include a plurality of distributed portions.

(2) Specific Example of Image Reading System for Combined Sorting:

FIG. 1 schematically shows a configuration of an image reading system SY1 including the image reading device 10 and the information processing device 100. FIG. 2 schematically shows the combined sorting that collects the electronic data EL1 of the documents OR1 associated with the common identification information IN1.

The image reading device 10 includes a reading unit 20 that generates the scan data SC1 by reading the documents OR1, and a document conveying unit 21 that conveys the documents OR1 to the reading unit 20 along a conveyance path passing through the reading unit 20, and performs a scan operation of sequentially reading the plurality of documents OR1. The information processing device 100 receives the scan data SC1 from the image reading device 10, and performs the combined sorting on the scan data SC1, as shown in FIG. 2.

The image reading device 10 shown in FIG. 1 further includes a control unit 11, a nonvolatile memory 15, a communication interface 16, and an operation panel 17. The control unit 11 includes a CPU 12, which is a processor, a ROM 13, which is a semiconductor memory, and a RAM 14, which is a semiconductor memory. Here, I/F shown in FIG. 1 is an abbreviation of an interface, CPU is an abbreviation of a central processing unit, ROM is an abbreviation of a read only memory, and RAM is an abbreviation of a random access memory. At least one of the ROM 13 and the nonvolatile memory 15 holds an image reading program. The CPU 12 executes the image reading program while using the RAM 14 as a work area, thereby performing various kinds of processing such as control processing of the operation panel 17, control processing of the reading unit 20, control processing of the document conveying unit 21, and output processing of the scan data SC1 of the documents OR1. A processor constituting the control unit 11 is not limited to one CPU, and may be a plurality of CPUs, a hardware circuit such as an ASIC, a combination of a CPU and a hardware circuit, or the like. Here, the ASIC is an abbreviation of an application specific integrated circuit. A semiconductor memory such as a flash memory, a magnetic recording medium such as a hard disk, or the like can be used as the nonvolatile memory 15.

The communication interface 16 transmits and receives data to and from the information processing device 100 connected in a wired or wireless manner according to a predetermined communication protocol. The communication interface 16 receives scan settings and the like from the information processing device 100, and transmits the scan data SC1 and the like to the information processing device 100. The connection between the communication interface 16 and the information processing device 100 may be a network connection such as a LAN or the Internet, or may be a local connection such as a USB connection. Here, LAN is an abbreviation for local area network, and USB is an abbreviation for universal serial bus.

The operation panel 17 may include a display panel that displays a screen and an operation reception unit that receives an operation on the screen. A display panel such as a liquid crystal panel can be used as the display panel. A touch panel attached to a surface of the display panel, a hard key including a keyboard, or the like can be used as the operation reception unit.

The reading unit 20 includes, for example, a light source that irradiates the document OR1 with light, an image sensor that performs photoelectric conversion, a light receiving optical system that guides reflected light from the document OR1 to the image sensor, an analog-digital conversion unit that converts an analog electric signal output from the image sensor into a digital pixel value group, and an image data storage processing unit that stores the scan data SC1 based on the pixel value group in the RAM 14. The reading unit 20 may read a front surface of the document OR1 with a front surface image sensor and read a back surface of the document OR1 with a back surface image sensor. In this case, the reading unit 20 generates the scan data SC1 by reading both sides of the document OR1.

The document conveying unit 21 includes, for example, a feed tray, a feed roller pair, a document separation unit, a multi-feed detection unit, a conveyance roller pair, a discharge roller pair, and a discharge tray. A document bundle OR0 in which the plurality of documents OR1 are stacked may be set on the feed tray. The document conveying unit 21 that successively feeds the plurality of documents OR1 to the reading unit 20 is called an ADF or an automatic paper feeding device. Here, the ADF is an abbreviation for auto document feeder. The reading unit 20 sequentially reads the plurality of documents OR1 included in the document bundle OR0 to generate the scan data SC1 corresponding to the plurality of documents OR1.

The image reading device 10 is not limited to a scanner dedicated machine, and may be a multifunction device having at least a part of a printing function, a facsimile communication function, an e-mail transmission function, and the like. The image reading device 10 may include all components in one housing, and may be configured by a plurality of devices that are divided so as to be able to communicate with each other.

The information processing device 100 shown in FIG. 1 includes a CPU 101 which is a processor, a ROM 102 which is a semiconductor memory, a RAM 103 which is a semiconductor memory, a storage device 104, an input device 105, and the communication interface 106. The scan data processing program PR0 for causing the computer to function as the information processing device 100 is stored in the storage device 104, read out to the RAM 103 by the CPU 101, and executed by the CPU 101. The scan data processing program PR0 may be referred to as driver software for controlling the image reading device 10 or may be referred to as a scanner driver. The plurality of functions implemented by the information processing device 100 by the scan data processing program PR0 include the acquisition function FU1 of the identification information IN1, the generation function FU2 of the file F0, and the reception function FU3 of receiving the constraint condition and the like, as shown in FIG. 2. Here, the file F0 is an example of the extraction data obtained by collecting the electronic data EL1 of the documents associated with the identification information IN1 among the plurality of read documents OR1. The constraint condition means a condition to be satisfied by the file F0 generated from the scan data SC1, and can be set by the user in the present specific example. The acquisition function FU1 and the generation function FU2 correspond to the processing unit U2 together with the CPU 101, the ROM 102, and the RAM 103. The reception function FU3 corresponds to the reception unit U3 that receives the constraint condition and the like together with the input device 105. The CPU 101 executes the scan data processing program PR0 while using the RAM 103 as a work area, thereby causing the information processing device 100 to implement the above described functions FU1 to FU3 and the like and performing various kinds of processing.

A processor constituting the information processing device 100 is not limited to one CPU, and may be a plurality of CPUs, a hardware circuit such as an ASIC, a combination of a CPU and a hardware circuit, or the like.

A semiconductor memory such as a flash memory, a magnetic recording medium such as a hard disk, or the like can be used as the storage device 104. When the scan data processing program PR0 is stored in the storage device 104, the storage device 104 becomes a computer-readable medium in which the scan data processing program PR0 is recorded. Of course, the scan data processing program PR0 may be recorded in an external recording medium and read from the external recording medium into the information processing device 100. In this case, the external recording medium is a computer-readable medium in which the scan data processing program PR0 is recorded.

In the present specific example, at least one of the RAM 103 and the storage device 104 is the storage unit U1 that stores the scan data SC1 read from the plurality of documents OR1 included in the document bundle OR0. That is, the scan data SC1 may be temporarily stored in the RAM 103, may be stored in the storage device 104 for long-term storage, or may be stored in both the RAM 103 and the storage device 104. The storage unit U1 in the present specific example stores the file F0 generated from the scan data SC1. That is, the file F0 may be temporarily stored in the RAM 103, may be stored in the storage device 104 for long-term storage, or may be stored in both the RAM 103 and the storage device 104. A file in a PDF format, a file in a document format, or the like can be adopted as the file F0.

A pointing device, a hard key including a keyboard, a touch panel attached to a surface of a display panel, or the like can be used as the input device 105. The communication interface 106 is connected to the communication interface 16 of the image reading device 10 in a wired or wireless manner, and transmits and receives data to and from the image reading device 10 according to a predetermined communication protocol. The communication interface 106 transmits scan settings and the like to the image reading device 10, and receives the scan data SC1 and the like from the image reading device 10. The communication interface 106 is an example of a communication unit. As described above, the connection between the communication interfaces 106 and 16 may be a network connection such as a LAN or the Internet, or may be a local connection such as a USB connection.

The information processing device 100 includes a computer such as a personal computer including a tablet terminal, a mobile phone such as a smartphone, and the like. For example, when a computer main body in a desktop personal computer is applied to the information processing device 100, the display unit 200 is usually connected to the computer main body. When the information processing device 100 outputs display data to the display unit 200, the display unit 200 displays a screen corresponding to the display data. When a display-integrated computer such as a notebook personal computer is applied to the information processing device 100, the information processing device 100 outputs the display data to the internal display unit 200. The information processing device 100 may have all components in one housing, and may be configured by a plurality of devices divided so as to be able to communicate with each other. Further, the present technique can be implemented even when at least a part of the image reading device 10 is inside the information processing device 100.

Next, an example of the combined sorting will be described with reference to FIG. 2. The document bundle OR0 shown in FIG. 2 means a collection of the plurality of documents OR1 for generating one scan data SC1, and may be set on the feed tray of the image reading device 10 in a plurality of separate times. FIG. 2 shows that the document bundle OR0 includes the documents OR1 from page 1 (p 1) to page 16 (p 16), thereby generating the scan data SC1 including the electronic data EL1 from the page 1 (p 1) to the page 16 (p 16). Hereinafter, a page number is simply indicated by "p+number". Each page of the scan data SC1 may be the electronic data EL1 on one side of the document OR1 or the electronic data EL1 on both sides of the document OR1.

The document bundle OR0 includes a document having the identification code C0. The processing unit U2 that performs the combined sorting acquires the identification information IN1 included in the identification code C0 present in the plurality of documents OR1 based on the scan data SC1. When a plurality of identification codes C0 are present in the plurality of documents OR1, the processing unit U2 acquires the identification information IN1 included in all the identification codes C0. In the document bundle OR0 shown in FIG. 2, identification codes C1 are present in p 3 and p 12, an identification code C2 is present in p 7, and an identification code C3 is present in p 14. In this case, the processing unit U2 acquires identification information "10125" included in the identification codes C1, acquires identification information "20378" included in the identification code C2, and acquires identification information "30493" included in the identification code C3. Here, the identification codes C1, C2, and C3 are included in the identification code C0, and the identification information "10125", "20378", and "30493" are included in the identification information IN1.

The processing unit U2 associates the identification information IN1 with the electronic data EL1 of the documents that can be associated with the identification information IN1 among the plurality of documents OR1. When a plurality of types of identification information IN1 are acquired, the processing unit U2 generates, in the storage unit U1, the file F0 in which the electronic data EL1 of the documents OR1 are collected for each type of identification information IN1. Here, the processing unit U2 collects at least a page from a page from which certain identification information IN1 is acquired to a page immediately before different identification information IN1 is acquired. For example, it is assumed that the identification information "10125" is acquired at p 3, the identification information IN1 is not acquired at p 4 to p 6, and the identification information "20378" is acquired at p 7. In this case, p 3 to p 6 are associated with the identification information "10125", and the electronic data EL1 of p 3 to p 6 are included in one file F1 corresponding to the identification information "10125". Further, it is assumed that the identification information "20378" is acquired at p 7, the identification information IN1 is not acquired at p 8 to p 11, and the identification information "10125" is acquired at p 12. In this case, p 7 to p 11 are associated with the identification information "20378", and the electronic data EL1 of p 7 to p 11 are included in one file F2 corresponding to the identification information "20378". Further, it is assumed that the identification information "10125" is acquired at p 12, the identification information IN1 is not acquired at p 13, and the identification information "30493" is acquired at p 14. In this case, p 12 and p 13 are associated with the identification information "10125", and the electronic data EL1 of p 12 and p 13 are added to one file F1 corresponding to the identification information "10125". The files F1, F2, and F3 shown in FIG. 2 are included in the file F0.

As described above, from the scan data SC1 shown in FIG. 2, the file F1 including the electronic data EL1 of p 3 to p 6 and p 12 and p 13 is generated, the file F2 including the electronic data EL1 of p 7 to p 11 is generated, and the file F3 including the electronic data EL1 of p 14 to p 16 is generated.

When it is not necessary to store the electronic data EL1 of the documents OR1 having the identification code C0, the processing unit U2 may generate the file F0 excluding the electronic data EL1 of the documents OR1 having the identification code C0.

(3) Specific Example of Information Included in Identification Code:

FIG. 3 schematically shows the information IN0 included in the identification code C0.

For example, a collection packaging commodity code is known as the identification code C0. The collection packaging commodity code is included in global trade item number, which is abbreviated as GTIN, and is called GTIN-14. The collection packaging commodity code is a barcode set for collection packaging such as a case, a ball, or a pallet, and is represented by an interleaved two of five (ITF) symbol. The collection packaging commodity code includes a first 1-digit indicator, 12-digit single item identification information subsequent to the indicator, and a last 1-digit check digit. There are eight types of indicators "1" to "8". The single item identification information is the first 12 digits of GTIN-13 called a Japanese article number (JAN) code, and can be referred to be information for identifying a single item included in the collection packaging. The check digit is uniquely set from the first 13 digits of the collection packaging commodity code. Therefore, the 14-digit information IN0 present in the collection packaging commodity code can be handled as the identification information IN1 as it is.

ITF-14, which is an ITF code represented by a 14-digit ITF symbol, can be referred to be a logistics commodity code including manufacturer identification information and commodity item identification information. The logistics commodity code as the identification code C0 shown in FIG. 3 includes a first 1-digit logistics identification code, a 2-digit country code subsequent to the logistics identification code, 5-digit manufacturer identification information subsequent to the country code, 5-digit commodity item identification information subsequent to the manufacturer identification information, and a last 1-digit check digit. The 2-digit country code is information for identifying a country. The manufacturer identification information is information for identifying a manufacturer of a commodity item group. The commodity item identification information is information for identifying a commodity item included in the commodity item group. The check digit is uniquely set from the first 13 digits of the logistics commodity code. Therefore, the 14-digit information IN0 present in the logistics commodity code can be handled as the identification information IN1 as it is.

As the identification code C0, a periodic publication code is known. The periodic publication code is represented by 18 digits in which a 5-digit add-on code for price representation is added to 13 digits conforming to the GTIN-13 called the JAN code, and is a barcode set for a periodic publication such as a magazine and a newspaper. The periodic publication code shown in FIG. 3 includes a first 3-digit flag, a 1-digit preliminary code subsequent to the flag, 5-digit periodic publication identification information subsequent to the preliminary code, a 2-digit issue number subsequent to the periodic publication identification information, a 1-digit year number subsequent to the issue number, a 1-digit check digit subsequent to the year number, and a 5-digit add-on code subsequent to the check digit. The periodic publication identification information is information for identifying a periodic publication. The issue number is information for identifying a period in an issue year, such as a month issue number signifying an issue month. The year number represents the last one digit of the Gregorian calendar. Therefore, the 2-digit issue number and the 1-digit year number mean an issue period having three digits. The check digit is uniquely set from the first 13 digits of the periodic publication code. The 5-digit add-on code is information such as a main unit price in yen. Therefore, the 18-digit information IN0 present in the periodic publication code can be handled as the identification information IN1 as it is.

As shown in FIG. 4, the identification information IN1 may be a part of the information IN0 included in the identification code C0. FIG. 4 schematically shows an example in which a part of the information IN0 included in the identification code C0 is set as the identification information IN1.

For example, the identification information IN1 included in the collection packaging commodity code may be 12-digit single item identification information. In this case, 1-digit indicator and 1-digit check digit are attached information IN2 attached to the identification information IN1. The 1-digit indicator can also be referred to be sorting information IN3 for sorting a single item which is a target of the single item identification information.

The identification information IN1 included in the logistics commodity code shown in FIG. 4 may be 5-digit manufacturer identification information. In this case, 1-digit logistics identification code, 2-digit country code, 5-digit commodity item identification information, and 1-digit check digit are the attached information IN2 attached to the identification information IN1. The 5-digit commodity item identification information can also be referred to as sorting information IN3 for sorting a manufacturer that is the target of the manufacturer identification information.

The identification information IN1 included in the periodic publication code shown in FIG. 4 may be 5-digit periodic publication identification information. In this case, the 3-digit flag, the 1-digit preliminary code, the 2-digit issue number, the 1-digit year number, the 1-digit check digit, and the 5-digit add-on code are the attached information IN2 attached to the identification information IN1. The 2-digit issue number and the 1-digit year number can also be referred to as the sorting information IN3 for sorting the periodic publication, which is the target of the periodic publication identification information.

When the user generates the file F0 in which the electronic data EL1 of the documents OR1 associated with the identification information IN1 are collected by reading a large number of documents OR1, it is difficult for the user to confirm in advance the number of documents OR1 associated with the identification information IN1 in the document bundle OR0. Therefore, even if the user fails to perform the reading operation such as mix-up of the document bundle OR0 or scanning of the scanned documents OR1, the user does not immediately notice the failure. A work of opening the file F0 and visually confirming a content thereof to find the failure in the reading operation takes time and effort.

The information processing device 100 according to the present specific example determines whether the generation result of the file F0 is against the constraint condition, and performs the specific processing which is not performed when the generation result matches with the constraint condition when the generation result is against the constraint condition. Accordingly, the usability can be improved.

(4) Specific Example of Processing Performed by Information Processing Device:

FIG. 5 schematically shows a UI screen 500 displayed on the display unit 200. Here, UI is an abbreviation of a user interface. Upon receiving an operation of instructing a setting of the combined sorting through the input device 105, the reception unit U3 of the information processing device 100 causes the display unit 200 to display the UI screen 500.

The UI screen 500 shown in FIG. 5 includes a detection region setting region 501, an identification code setting region 502, a detected maximum character number setting region 503, a recognition result confirmation check region 504, a combined sorting check region 505, a constraint condition selection field 506, a violation processing selection field 507, a classification method selection field 508, a storage destination setting region 509, an OK button 510, and the like. The information processing device 100 performs the reception step ST3 of receiving a setting of the constraint condition or the like by receiving the operation on the UI screen 500 through the input device 105.

The detection region setting region 501 is a display region for receiving a setting of a region for detecting the identification code C0 from each document OR1. The reception unit U3 receives a selection item of either "automatic detection" or "area designation" in the detection region setting region 501. The "automatic detection" is a selection item for detecting the identification code C0 from an entire range of the documents OR1. The "area designation" is a selection item for designating a region in which the identification code C0 is to be detected in the entire range of the documents OR1. When the "area designation" is selected, the reception unit U3 causes the display unit 200 to display a screen, which is not shown, that receives a designation of a region in which the identification code C0 is to be detected, and receives the designation of the region in which the identification code C0 is to be detected on the screen.

The identification code setting region 502 is a display region for receiving a setting of a type of the identification code C0 to be detected. In FIG. 5, "AAA", "BBB", "CCC", and "DDD" are shown as the types of the identification code C0. The items include the identification code C0 shown in FIG. 3, for example, the collection packaging commodity code, the logistics commodity code, and the periodic publication code. The reception unit U3 receives the setting of one or more items among the plurality of items shown in FIG. 5.

The detected maximum character number setting region 503 is a display region for receiving a setting of a maximum character number of the information IN0 acquired from the identification code C0. When the reception unit U3 receives the setting of the maximum character number in the detected maximum character number setting region 503, the information IN0 is acquired from the identification code C0 within a range of the maximum character number.

The recognition result confirmation check region 504 is a display region for receiving a setting as to whether to display the detected identification code C0. When the recognition result confirmation check region 504 is checked, the detected identification code C0 is displayed on the display unit 200.

The combined sorting check region 505 is a display region for receiving a setting as to whether to perform the combined sorting. When the combined sorting check region 505 is checked, the combined sorting to which the present technique is applied is performed. Hereinafter, the description will be made on the premise that the combined sorting check region 505 is checked.

The constraint condition selection field 506 is a display region for receiving a setting of a constraint condition to be satisfied by the file F0 in which the electronic data EL1 of the documents OR1 associated with the identification information IN1 are collected. The reception unit U3 receives selection of an item shown in FIG. 6 in the constraint condition selection field 506. Details of the selection items of the constraint condition will be described later.

The violation processing selection field 507 is a display region for receiving a setting of specific processing to be performed when a generation result of the file F0 is against the constraint condition. The reception unit U3 receives selection of items shown in FIG. 7 in the violation processing selection field 507. Details of the selection items of the specific processing will be described later.

The classification method selection field 508 is a display region for receiving a setting of the identification information IN1 associated with the documents OR1 among the information IN0 included in the identification code C0. The reception unit U3 receives selection of items shown in FIG. 8 in the classification method selection field 508. Details of the selection items of the identification information IN1 will be described later.

The storage destination setting region 509 is a display region for receiving a setting of a location where the file F0 is stored. When the reception unit U3 receives a setting of a storage destination of the file F0 in the storage destination setting region 509, the file F0 is stored in the storage destination.

Upon receiving an operation of the OK button 510 through the input device 105, the reception unit U3 stores the setting received in the above described display regions (501 to 509) in the storage unit U1, and deletes the UI screen 500 from the display unit 200.

FIG. 6 schematically shows a display that changes according to the items of the constraint condition selection field 506. The user can select any one item from among "maximum page number", "minimum page number", "even-odd page number", "range designation of page number", and "no" in the constraint condition selection field 506.

The "maximum page number" is a selection item for setting an upper limit of a page number of the file F0 generated from the scan data SC1. When the "maximum page number" is selected in the constraint condition selection field 506, the reception unit U3 causes the display unit 200 to display a maximum page number setting region 521 under the constraint condition selection field 506 in the UI screen 500. The maximum page number setting region 521 is a display region for receiving a setting of the upper limit of the page number of the file F0, that is, the maximum page number of the file F0. The reception unit U3 receives, through the input device 105, the setting of the maximum page number of the file F0 in the maximum page number setting region 521. As described above, the reception unit U3 can receive the setting of the maximum page number of the extraction data as the constraint condition.

The "minimum page number" is a selection item for setting a lower limit of the page number of the file F0 generated from the scan data SC1. When the "minimum page number" is selected in the constraint condition selection field 506, the reception unit U3 causes the display unit 200 to display a minimum page number setting region 522 under the constraint condition selection field 506 in the UI screen 500. The minimum page number setting region 522 is a display region for receiving a setting of the lower limit of the page number of the file F0, that is, the minimum page number of the file F0. The reception unit U3 receives, through the input device 105, the setting of the minimum page number of the file F0 in the minimum page number setting region 522. As described above, the reception unit U3 can receive the setting of the minimum page number of the extraction data as the constraint condition.

The "even-odd page number" is a selection item for setting whether the page number of the file F0 generated from the scan data SC1 should be an even number or an odd number. When the "even-odd page number" is selected in the constraint condition selection field 506, the reception unit U3 causes the display unit 200 to display an even-odd number setting region 523 under the constraint condition selection field 506 in the UI screen 500. The even-odd number setting region 523 is a display region for receiving a setting as to whether the page number of the file F0 should be an even number or an odd number. The reception unit U3 receives the selection item of either "even" or "odd" in the even-odd number setting region 523. The "even number" is a selection item for constricting the page number of the file F0 to an even number. The "odd number" is a selection item for constricting the page number of the file F0 to an odd number. As described above, the reception unit U3 can receive, as the constraint condition, the setting for selecting whether the page number of the extraction data is an even number or an odd number.

The "range designation of page number" is a selection item for setting a range of the page number of the file F0 generated from the scan data SC1. When the "range designation of page number" is selected in the constraint condition selection field 506, the reception unit U3 causes the display unit 200 to display a page number range setting region 524 under the constraint condition selection field 506 in the UI screen 500. The page number range setting region 524 is a display region for receiving a range of the page number of the file F0, that is, the setting of the minimum page number and the maximum page number in the file F0. The reception unit U3 receives, through the input device 105, the setting of the minimum page number and the maximum page number in the file F0 in the page number range setting region 524. As described above, the reception unit U3 can receive the range of the page number of the extraction data as the constraint condition. It can be said that the reception unit U3 receives both the minimum page number of the extraction data and the maximum page number of the extraction data in the page number range setting region 524.

For reference, "no" is a selection item for not setting a constraint condition. When an item other than "no" is selected in the constraint condition selection field 506, according to the present technique, different processing is performed according to whether the generation result of the file F0 is against the constraint condition.

As described above, the reception unit U3 receives the setting of the constraint condition in the constraint condition selection field 506.

FIG. 7 schematically shows items of the violation processing selection field 507. In the violation processing selection field 507, the user can select any one item from among a "divide file" item 531, a "display error" item 532, and a "suspend job" item 533. The reception unit U3 receives the setting of the specific processing to be performed when the generation result of the file F0 is against the constraint condition in the violation processing selection field 507.

The "divide file" item 531 is a selection item for setting division processing of dividing the file F0 as the specific processing. When the "divide file" item 531 is selected, the processing unit U2 of the information processing device 100 divides the file F0 so as to be within the maximum page number when the "maximum page number" is set, and divides the file F0 so that one of the files after the division becomes an even number or an odd number set in the even-odd number setting region 523 when the "even-odd page number" is set. When the "range designation of page number" is set, the processing unit U2 divides the file F0 so that the upper limit of the range of the page number is the maximum page number and is within the maximum page number. When the "minimum page number" is set, the reception unit U3 does not receive the selection of the "divide file" item 531.

As described above, the reception unit U3 can receive the setting of the division processing of dividing the extraction data as the specific processing.

The "display error" item 532 is a selection item for setting error display processing for displaying the error 601 as shown in FIG. 12 as the specific processing. When the "display error" item 532 is selected, the processing unit U2 displays the error 601 on the display unit 200 when the generation result of the file F0 is against the constraint condition.

As described above, the reception unit U3 can receive the setting of the error display processing of displaying the error 601 as the specific processing.

The "suspend job" item 533 is a selection item for setting suspension processing in which the file F0 is not stored as the specific processing. When the "suspend job" item 533 is selected, the processing unit U2 does not store the file F0 when the generation result of the file F0 is against the constraint condition.

As described above, the reception unit U3 can receive the setting of the suspension processing in which the extraction data is not stored as the specific processing.

FIG. 8 schematically shows items of the classification method selection field 508. In the classification method selection field 508, the user can select any one item from among a "complete match" item 541, a "collection packaging commodity code" item 542, a "manufacturer code" item 543, a "commodity item code" item 544, a "periodic publication code" item 545, a "user definition" item 546, and a "setting" item 547. The reception unit U3 receives, in the classification method selection field 508, a setting of which of the information IN0 included in the identification code C0 is set as the identification information IN1.

The "complete match" item 541 is a selection item for setting all of the information IN0 included in the identification code C0 as the identification information IN1. The "collection packaging commodity code" item 542 is a selection item for setting, as the identification information IN1, the 12-digit single item identification information among the 14-digit information IN0 included in the collection packaging commodity code as the identification code C0. The "manufacturer code" item 543 is a selection item for setting, as the identification information IN1, the 5-digit manufacturer identification information among the 14-digit information IN0 included in the logistics commodity code as the identification code C0. The "commodity item code" item 544 is a selection item for setting, as the identification information IN1, the 5-digit commodity item identification information among the 14-digit information IN0 included in the logistics commodity code as the identification code C0. The "periodic publication code" item 545 is a selection item for setting, as the identification information IN1, the 5-digit periodic publication identification information among the 18-digit information IN0 included in the periodic publication code as the identification code C0. The "user definition" item 546 is a selection item for setting, as the identification information IN1, a portion in the information IN0 included in the identification code C0 set by the user. FIG. 8 shows that the first to 7-th digits of the information IN0 included in the identification code C0 are set as the identification information IN1. The "setting" item 547 is a selection item for setting which range of the information IN0 included in the identification code C0 is set as the identification information IN1. Upon receiving the selection of the "setting" item 547, the reception unit U3 causes the display unit 200 to display a range to be set as the identification information IN1, for example, a display region for receiving the setting of the first digit and the last digit, and receives the setting of the first digit and the last digit. The set range is shown in the "user definition" item 546.

Figure 9:
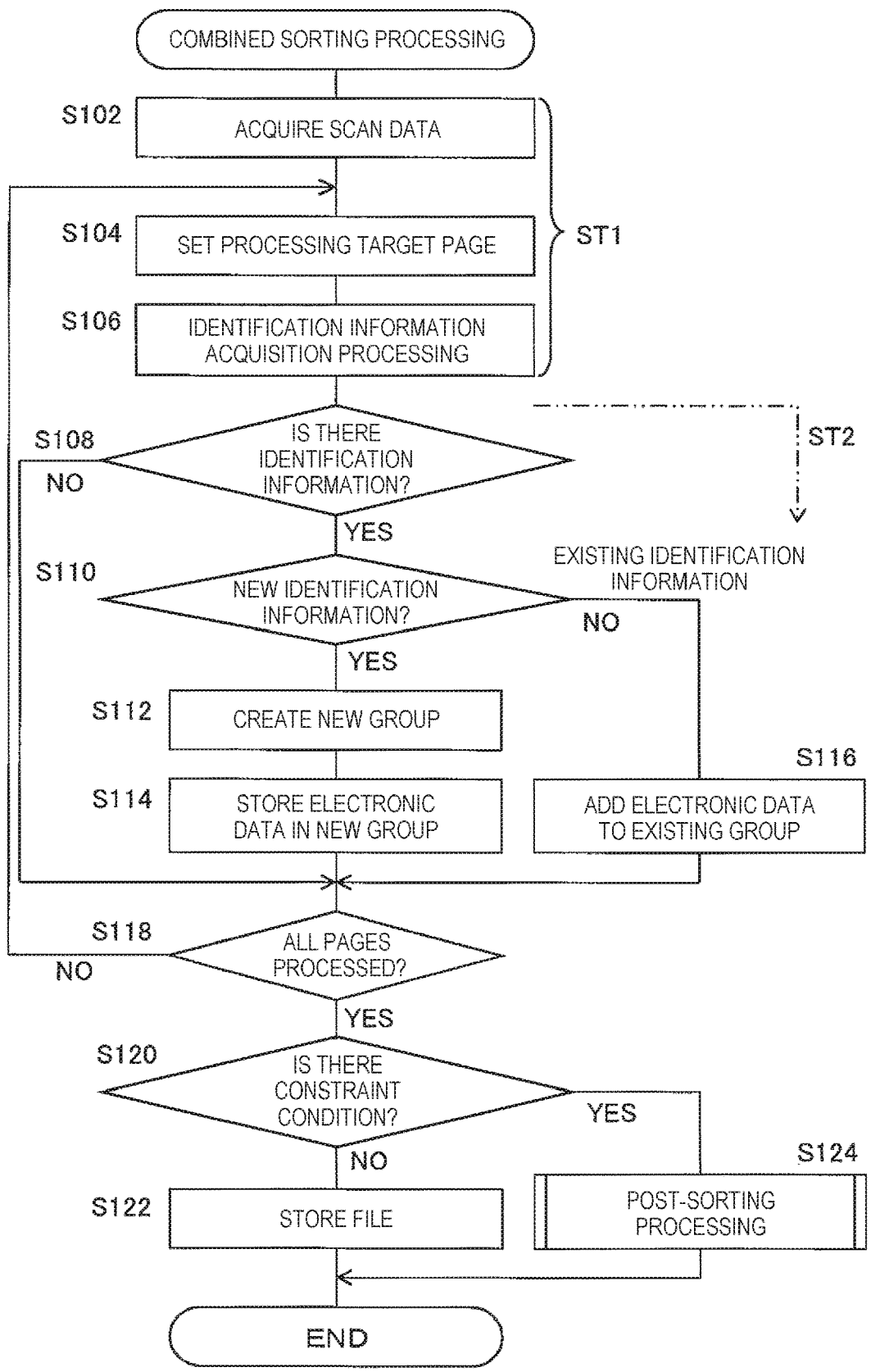
FIG. 9 is a flowchart showing an example of combined sorting processing.

FIG. 9 shows the combined sorting processing performed by the processing unit U2 of the information processing device 100. When the image reading device 10 reads the document bundle OR0, the processing unit U2 starts the combined sorting processing. Here, steps S102 to S106 correspond to the acquisition step ST1 of the identification information IN1 and the acquisition function FU1 shown in FIG. 1. Steps S108 to S124 correspond to the generation step ST2 of the file F0 and the generation function FU2 shown in FIG. 1. Hereinafter, the description of "step" may be omitted, and the reference numerals of the steps may be shown in parentheses.

When the combined sorting processing is started, the processing unit U2 acquires the scan data SC1 read from the plurality of documents OR1 included in the document bundle OR0 from the image reading device 10 via the communication interface 106, and stores the scan data SC1 in the storage unit U1 (S102). In the example shown in FIG. 2, it is indicated that the scan data SC1 including the electronic data EL1 for 16 pages is acquired from the documents OR1 for 16 pages included in the document bundle OR0 and is stored in the storage unit U1.

After acquiring the scan data SC1, the processing unit U2 sequentially sets processing target pages from among the plurality of pages included in the scan data SC1 (S104). The processing unit U2 in the present specific example sets the processing target pages in the scan data SC1 in the order in which the number of pages increases from the first page.

After setting the processing target page, the processing unit U2 performs identification information acquisition processing of acquiring the identification information IN1 included in the identification code C0 according to the item selected in the classification method selection field 508 shown in FIG. 8 (S106). For example, when the "complete match" item 541 shown in FIG. 8 is selected, the processing unit U2 acquires all of the information IN0 included in the identification code C0 as the identification information IN1. When the items (541 to 546) in which a part of the information IN0 is set as the identification information IN1 are selected, the processing unit U2 acquires a portion corresponding to the selected item in the information IN0 included in the identification code C0 as the identification information IN1.

When the identification code C0 is present in the processing target page, the processing unit U2 acquires the identification information IN1 included in the identification code C0 and associates the identification information IN1 with the processing target page. For example, in the scan data SC1 shown in FIG. 2, since the identification code C0 is present on the third page, the identification information IN1 included in the identification code C0 is acquired and associated with the processing target page of the third page. When the identification code C0 is not present in the processing target page, when the previous page is associated with the identification information IN1, the identification information IN1 is associated with the processing target page, and when the previous page is not associated with the identification information IN1, the identification information IN1 is not associated with the processing target page. For example, since the identification code C0 is not present in the fourth page of the scan data SC1 shown in FIG. 2, the identification information IN1 associated with the third page is associated with the fourth page.

After the information acquisition processing, the processing unit U2 branches the processing depending on whether there is the identification information IN1 associated with the processing target page (S108). The processing unit U2 advances the processing to S110 when there is the identification information IN1 associated with the processing target page, and advances the processing to S118 when there is no identification information IN1 associated with the processing target page.

In S110, the processing unit U2 branches the processing depending on whether the identification information IN1 associated with the processing target page is new identification information that appears for the first time. For example, in the scan data SC1 shown in FIG. 2, when the processing target page is the third page, the identification information "10125" appears for the first time, and thus becomes the new identification information. When the processing target page is the fourth page, the identification information "10125" is existing identification information that is already appeared.

When the identification information IN1 associated with the processing target page is the new identification information, the processing unit U2 advances the processing to S112, and creates a new group, which is a storage location of the electronic data EL1 associated with the new identification information, in the storage unit U1. Next, the processing unit U2 stores the electronic data EL1 corresponding to the processing target page in the new group (S114), and the processing proceeds to S118. In the example shown in FIG. 2, when the new identification information is the identification information "10125", the file F1 for collecting the electronic data EL1 of the identification information "10125" is prepared in the storage unit U1, and the electronic data EL1 of the third page is stored in the file F1.

On the other hand, when the acquired identification information IN1 is the existing identification information, the processing unit U2 advances the processing to S116, adds the electronic data EL1 corresponding to the processing target page to the existing group which is the created storage location of the electronic data EL1 associated with the existing identification information, and advances the processing to S118. In the example shown in FIG. 2, the electronic data EL1 of the fourth page is added to the file F1 for collecting the electronic data EL1 of the identification information "10125".

In S118, the processing unit U2 branches the processing depending on whether or not all pages included in the scan data SC1 are processed. When there is a page that is not set as the processing target page among the pages included in the scan data SC1, the processing unit U2 repeats the processing from S104 to S118. In the example shown in FIG. 2, the file F1 including the electronic data EL1 of p 3 to p 6 and p 12 and p 13 associated with the identification information "10125" is generated, the file F2 including the electronic data EL1 of p 7 to p 11 associated with the identification information "20378" is generated, and the file F3 including the electronic data EL1 of p 14 to p 16 associated with the identification information "30493" is generated.

When all the pages included in the scan data SC1 are processed, the processing unit U2 branches the processing depending on whether any one of the constraint conditions of "maximum page number", "minimum page number", "even-odd page number", and "range designation of page number" is set by the selection in the constraint condition selection field 506 shown in FIGS. 5 and 6 (S120). When the constraint condition is not set, the processing unit U2 stores the generated file F0 in the set storage destination (S122), and ends the combined sorting processing. In the example shown in FIG. 2, the files F1, F2, and F3 are stored in the storage destination. When the constraint condition is set, the processing unit U2 performs post-sorting processing described later (S124), and ends the combined sorting processing.

As described above, the processing unit U2 performs the specific processing when the generation result of the extraction data is against the constraint condition, and stores the extraction data without performing the specific processing when the generation result of the extraction data is not against the constraint condition.

FIG. 10 shows the post-sorting processing performed by the processing unit U2. S202 to S214 in the post-sorting processing correspond to the generation step ST2 of the file F0 and the generation function FU2 shown in FIG. 1.

When the post-sorting processing is started, the generation result of the file F0 is analyzed, and the processing is branched according to whether the set constraint condition is matched with (S202). When the generation result of the file F0 matches with the constraint condition, the processing unit U2 advances the processing to S212, stores the generated file F0 in the set storage destination (S212), and ends the post-sorting processing. When the generation result of the file F0 is against the constraint condition, the processing unit U2 advances the processing to S204, performs the specific processing indicated after the branch processing of S204, and ends the post-sorting processing.

As described above, the processing unit U2 performs different processing depending on whether the generation result of the extraction data is against the set constraint condition. When the "maximum page number" shown in FIG. 6 is the constraint condition, the processing unit U2 performs different processing depending on whether the page number of the file F0 is larger than the maximum page number. When the "minimum page number" shown in FIG. 6 is the constraint condition, the processing unit U2 performs different processing depending on whether the page number of the file F0 is smaller than the minimum page number. When the "even-odd page number" shown in FIG. 6 is the constraint condition, the processing unit U2 performs different processing depending on whether the page number of the file F0 is an odd number or an even number.

In S204, the processing unit U2 branches the processing according to the specific processing set in the violation processing selection field 507 shown in FIGS. 5 and 7.

When the "divide file" processing is set as the specific processing by the selection in the violation processing selection field 507, the processing unit U2 performs the processing of dividing the file F0 (S206), stores the divided file F0 in the set storage destination (S212), ends the post-sorting processing, and ends the combined sorting processing shown in FIG. 9. Therefore, when the setting of the division processing is received, the processing unit U2 divides the extraction data based on the constraint condition, and stores the divided extraction data.

FIG. 11 schematically shows a state in which the file F0 is divided when the constraint condition is violated. As the constraint condition, it is assumed that the "maximum page number" shown in FIG. 6 is five pages.

The document bundle OR0 shown in FIG. 11 includes the documents OR1 of p 1 to p 14, and the identification code C1 is present at p 8 and the identification code C2 is present at p 3 and p 10 in the document bundle OR0. From the scan data SC1 read from the plurality of documents OR1, and by the processing of S102 to S118 shown in FIG. 9, the file F1 having the electronic data EL1 of p 8 to p 9 associated with the identification information "10125" is generated, and the file F2 having the electronic data EL1 of p 3 to p 7 and p 10 to p 14 associated with the identification information "20378" is generated. Since the page number of the file F1 associated with the identification information "10125" is two pages which is smaller than the maximum page number of five pages, the generation result of the file F1 satisfies the constraint condition. On the other hand, since the number of pages of the file F2 associated with the identification information "20378" is 10 pages which is larger than the maximum page number of five pages, the constraint condition is not satisfied. Therefore, in S206, the processing unit U2 performs the processing of dividing the file F2 into the files F21 and F22 having the maximum page number of five or less. The files F21 and F22 are examples of the extraction data after the division. FIG. 11 shows that the file F2 is divided into the file F21 having five pages of electronic data EL1 and the file F22 having five pages of electronic data EL1.

When the page number of the file F0 is larger than the maximum page number, there is a high possibility that an error occurs in the combined sorting. In this case, the file F0 is divided such that the page number of the file F0 is equal to or less than the maximum page number. Therefore, the workability at the time of the combined sorting is improved. The "divide file" as the violation processing can be used when the page number of a file to be stored is desired to be a certain number. The same applies to a case where the page number of the file F0 is larger than the maximum page number of the "range designation of page number" shown in FIG. 6.

When the "even-odd page number" shown in FIG. 6 is set, the processing unit U2 divides the file F0 such that one of the files after the division is an even number or an odd number set in the even-odd number setting region 523. For example, when the page number of the file F0 is against the setting, the processing unit U2 may divide the file F0 into a file excluding the last page and a file having the last page. When it is guaranteed that the page number of the file F0 is an even number or an odd number, one of the files after the division is adjusted to the setting of "even-odd page number", so that the workability at the time of the combined sorting is improved.

In the branch processing of S204 shown in FIG. 10, when the "display error" processing is set as the specific processing by the selection in the violation processing selection field 507, the processing unit U2 displays the error 601 on the display unit 200 as shown in FIG. 12 (S208).

FIG. 12 schematically shows a page deletion reception screen 600 displayed on the display unit 200. In response to an instruction from the processing unit U2, the reception unit U3 of the information processing device 100 displays the page deletion reception screen 600 on the display unit 200.

The page deletion reception screen 600 shown in FIG. 12 includes a preview 602 for each page included in the file F0, a deletion check region 603 corresponding to each preview 602, an OK button 604, and the like, in addition to the display of the error 601. The information processing device 100 performs the reception step ST3 by receiving an operation on the page deletion reception screen 600 through the input device 105. In the reception step ST3, the information processing device 100 receives a designation of a page from which the electronic data EL1 is to be deleted from the file F0.

The error 601 indicates what kind of constraint condition the generation result of the file F0 is against. For example, when the page number of the file F1 associated with the identification information "10125" exceeds the maximum page number "5", the error 601 as shown in FIG. 12 is displayed on the display unit 200.

Each deletion check region 603 is arranged at a position corresponding to the preview 602, and is a display region for receiving a selection as to whether to delete the electronic data EL1 corresponding to the preview 602. Upon receiving an operation of the OK button 604 through the input device 105, the reception unit U3 stores information on a to-be-deleted page corresponding to the checked deletion check region 603 in the storage unit U1, and deletes the page deletion reception screen 600 from the display unit 200.

The processing unit U2 performs, based on the information on the to-be-deleted page, page deletion processing of deleting the electronic data EL1 of the to-be-deleted page designated on the page deletion reception screen 600 from the file F0 (S210), stores the file F0 after the deletion in the set storage destination (S212), ends the post-sorting processing, and ends the combined sorting processing shown in FIG. 9. Therefore, when the setting of the error display processing is received, the processing unit U2 deletes the electronic data EL1 of the designated to-be-deleted page from the extraction data, and stores the extraction data after the deletion.

For example, when the "maximum page number" shown in FIG. 6 is set as the constraint condition and the page number of the file F0 is larger than the maximum page number, the error 601 to that effect is displayed, and the user can confirm the content of the file F0 on the page deletion reception screen 600. In this case, the user can delete an inappropriate page from the file F0 on the page deletion reception screen 600, and can obtain the correct file F0.

When the "minimum page number" shown in FIG. 6 is set as the constraint condition and the page number of the file F0 is smaller than the minimum page number, the error 601 to that effect is displayed, and the user can confirm the content of the file F0 on the page deletion reception screen 600. Therefore, the user can grasp an error such as a loss of page in the combined sorting.

When the "even-odd page number" shown in FIG. 6 is set as the constraint condition and the page number of the file F0 is against the setting, the error 601 to that effect is displayed, and the user can confirm the content of the file F0 on the page deletion reception screen 600. Therefore, the user can grasp an error such as the mixing of an erroneous page or the loss of page in the combined sorting.

When the "range designation of page number" shown in FIG. 6 is set as the constraint condition and the page number of the file F0 is out of the range of the setting, the error 601 to that effect is displayed, and the user can confirm the content of the file F0 on the page deletion reception screen 600.

As exemplified above, the user can grasp that an error occurs in the combined sorting by displaying the error 601. The user can delete an inappropriate page from the file F0 on the page deletion reception screen 600, and can obtain the correct file F0. Therefore, the workability at the time of the combined sorting is improved.

In the branch processing of S204 shown in FIG. 10, when the "suspend job" processing is set as the specific processing by the selection in the violation processing selection field 507, the processing unit U2 causes the display unit 200 to display the suspension of the job (S214), ends the post-sorting processing without storing the file F0, and ends the combined sorting processing shown in FIG. 9. Therefore, when the processing unit U2 receives the setting of the suspension processing, the processing unit U2 does not store the extraction data. Since the processing is suspended when an error occurs in the combined sorting, the usability at the time of the combined sorting is improved.

In the above case, the user confirms the document bundle OR0 and causes the image reading device 10 to read the document bundle OR0 again.

As described above, in the combined sorting that collects the electronic data EL1 of the documents OR1 associated with the common identification information IN1, when an error occurs, the division processing, the error display processing, or the suspension processing is performed as the specific processing, and when no error occurs, the file F0 is stored without performing the specific processing. Therefore, the present specific example can improve the usability at the time of the combined sorting.

(5) Modification:

Various modifications are conceivable for the present disclosure.

For example, the processing of S102 shown in FIG. 9 is not limited to being performed when the scan data SC1 is received from the image reading device 10, and may be processing of reading the scan data SC1 stored in the storage device 104 into the RAM 103.

The extraction data obtained by collecting the electronic data EL1 of the documents associated with the identification information IN1 among the plurality of documents OR1 is not limited to one file, and may be a collection of files in units of pages stored in a folder associated with the identification information IN1. As the file stored in the folder, a file in an image format such as a bitmap format can be adopted.

In the UI screen 500 shown in FIG. 5, a part of the display regions (501 to 509) may be omitted.

For example, when the UI screen 500 shown in FIG. 5 does not have the classification method selection field 508 and the processing of acquiring the identification information IN1 is determined in advance, such as a case where the information IN0 included in the identification code C0 is always used as the identification information IN1, a basic effect of improving the usability at the time of the combined sorting is obtained.

Even when the UI screen 500 shown in FIG. 5 does not have the violation processing selection field 507 and the specific processing is determined in advance, for example, an error is always displayed when the generation result of the file F0 is against the constraint condition, the basic effect of improving the usability at the time of the combined sorting can be obtained.

Even when the UI screen 500 shown in FIG. 5 does not have the constraint condition selection field 506 and the constraint condition is determined in advance, such as a case where the constraint condition is always the maximum page number, the basic effect of improving the usability at the time of the combined sorting can be obtained.

(6) Conclusion:

As described above, according to the present disclosure, it is possible to provide a technique and the like capable of improving the usability at the time of the combined sorting by various aspects. Of course, the above described basic functions and effects can be obtained even with a technique including only the constituent requirements according to the independent claims.

It is also possible to implement a configuration in which components disclosed in the above described examples are replaced with one another or a combination of the components is changed, a configuration in which components disclosed in a known technique and examples described above are replaced with one another or a combination of the components is changed, and the like. The present disclosure also includes such configurations and the like.

What is claimed is:

1. An information processing device comprising:
   a memory configured to store scan data read from a plurality of documents; and
   a processor configured to acquire, based on the scan data, identification information corresponding to an identification code present in the documents, and generate, based on the scan data, extraction data obtained by collecting electronic data of the documents associated with the identification information among the plurality of documents;
   a receiver configured to receive an association between an analysis result and processing from a user, wherein
   the processor analyzes the extraction data and performs different processing depending on whether a generation result of the extraction data is against a set constraint condition, and
   in a case where the set constraint condition is one of a minimum page number or a maximum page number, the processor analyzes a page number of the extraction data, and performs processing according to whether the page number of the extraction data is larger than the minimum page number or greater than the maximum page number.

2. The information processing device according to claim 1, wherein
   in a case where the set constraint condition is an even number or an odd number, the processor analyzes a page number of the extraction data and performs processing according to whether the page number of the extraction data is the odd number or the even number.

3. The information processing device according to claim 1, wherein
   the processor performs one of storing the extraction data and not storing the extraction data in accordance with the analysis result.

4. The information processing device according to claim 3, wherein
   the processor stores the extraction data according to the analysis result, or divides the extraction data and stores the data after the division based on a violation processing selection field.

5. The information processing device according to claim 3, wherein
the receiver is configured to receive an association between the analysis result and error display processing of displaying an error, and
the processor displays an associated error on a display unit according to the analysis result.

6. The information processing device according to claim 5, wherein
the receiver receives a designation of a page from which the electronic data is to be deleted through the displayed error, and
the processor deletes the electronic data corresponding to the page from the extraction data, and stores the extraction data after the deletion.

7. The information processing device according to claim 1, further comprising:
a communicator configured to receive the scan data from an image reading device, wherein
the memory stores the received scan data.

8. A non-transitory computer-readable storage medium storing a scan data processing program configured to process scan data read from a plurality of documents, the program causing a computer to implement:
acquiring, based on the scan data, identification information corresponding to an identification code present in the documents;
generating, based on the scan data, extraction data obtained by collecting electronic data of the documents associated with the identification information among the plurality of documents; and
receiving an association between an analysis result and processing from a user, wherein
the generation function analyzes the extraction data and performs different processing depending on whether a generation result of the extraction data is against a set constraint condition,
performs one of storing the extraction data and not storing the extraction data in accordance with the analysis result, and
stores the extraction data according to the analysis result, or divides the extraction data and stores the data after the division based on a violation processing selection field.

9. An information processing device comprising:
a memory configured to store scan data read from a plurality of documents; and
a processor configured to acquire, based on the scan data, identification information corresponding to an identification code present in the documents, and generate, based on the scan data, extraction data obtained by collecting electronic data of the documents associated with the identification information among the plurality of documents;
a receiver configured to receive an association between an analysis result and processing from a user, wherein
the processor analyzes the extraction data and performs different processing depending on whether a generation result of the extraction data is against a set constraint condition,
the processor performs one of storing the extraction data and not storing the extraction data in accordance with the analysis result, and
the processor stores the extraction data according to the analysis result, or divides the extraction data and stores the data after the division based on a violation processing selection field.

10. The information processing device according to claim 9, wherein
in a case where the set constraint condition is an even number or an odd number, the processor analyzes a page number of the extraction data and performs processing according to whether the page number of the extraction data is the odd number or the even number.

11. The information processing device according to claim 9, wherein
the receiver is configured to receive an association between the analysis result and error display processing of displaying an error, and
the processor displays an associated error on a display unit according to the analysis result.

12. The information processing device according to claim 11, wherein
the receiver receives a designation of a page from which the electronic data is to be deleted through the displayed error, and
the processor deletes the electronic data corresponding to the page from the extraction data, and stores the extraction data after the deletion.

13. The information processing device according to claim 9, further comprising:
a communicator configured to receive the scan data from an image reading device, wherein
the memory stores the received scan data.

14. The information processing device according to claim 9, wherein in a case where the set constraint condition is a minimum page number, the processor analyzes a page number of the extraction data, and performs processing according to whether the page number of the extraction data is larger than the minimum page number.

15. The information processing device according to claim 9, wherein in a case where the set constraint condition is a maximum page number, the processor analyzes a page number of the extraction data, and performs processing according to whether the page number of the extraction data is greater than the maximum page number.

* * * * *